March 3, 1959 — J. J. KEYSER — 2,875,645
COUPLING FOR INTERCONNECTING THE INDIVIDUAL SECTIONS
OF LONG COMPOUND ROLLERS, DRUMS, SHAFTS, OR
THE LIKE OF TEXTILE MACHINES Filed July 29, 1957 — 3 Sheets-Sheet 1

INVENTOR
Johann Jacob Keyser
By
Patent Agent

March 3, 1959  
J. J. KEYSER  
2,875,645  
COUPLING FOR INTERCONNECTING THE INDIVIDUAL SECTIONS  
OF LONG COMPOUND ROLLERS, DRUMS, SHAFTS, OR  
THE LIKE OF TEXTILE MACHINES  
Filed July 29, 1957  
3 Sheets-Sheet 2

INVENTOR  
Johann Jacob Keyser  
By  
Patent Agent.

March 3, 1959   J. J. KEYSER   2,875,645
COUPLING FOR INTERCONNECTING THE INDIVIDUAL SECTIONS
OF LONG COMPOUND ROLLERS, DRUMS, SHAFTS, OR
THE LIKE OF TEXTILE MACHINES
Filed July 29, 1957   3 Sheets-Sheet 3

INVENTOR
Johann Jacob Keyser
By
Patent Agent

United States Patent Office 2,875,645
Patented Mar. 3, 1959

2,875,645

COUPLING FOR INTERCONNECTING THE INDIVIDUAL SECTIONS OF LONG COMPOUND ROLLERS, DRUMS, SHAFTS, OR THE LIKE OF TEXTILE MACHINES

Johann Jacob Keyser, Aarau, Switzerland, assignor to Schiess Aktiengesellschaft, Dusseldorf-Oberkassel, Germany, a firm of Germany Application July 29, 1957, Serial No. 674,661

Claims priority, application Germany July 30, 1956

12 Claims. (Cl. 74—665)

The present invention relates to a coupling for interconnecting the individual sections of long composite rollers, shafts, drums, or the like. More particularly, the invention relates to a coupling for connecting the adjacent sections of certain elements used in spinning and other textile machines.

Textile machines, and especially spinning machines, usually contain various rollers, shafts, cylinders, or the like which extend along the entire length of the machine and are composed of several interconnected parts. This is true, for example, for the grooved rollers of the drafting frames of spinning machines, the feeding rollers of twisting machines, the lap rollers of bobbin winders, and for other conveying and feed rollers or drive shafts. Such rollers or shafts which have to extend over very great lengths are usually composed of numerous individal sections which are interconnected by means of suitable couplings. These couplings must connect said sections precisely coaxially with each other, while properly transmitting the torque said coupling must furthermore be able easily to be connected to and removed from the adjacent shaft, roller, or drum sections. Heretofore, it has been found very difficult to provide a coupling design which meets all of these requirements, particularly in view of the numerous stations where such couplings have to be applied on the long shafts, rollers, or cylinders of a machine of the mentioned kind.

These difficulties occur especially in the rollers of the drafting frames of billies and finishing machines, for example, in the luffing drums, spinning drums, or driving drums for the belts or straps, which extend over the entire length of the spinning machine and are many feet long. For reasons of easier manufacture, installation, and repair, such rollers are composed of exchangeable sections which usually extend from one bearing to the other, are mounted in these bearings, and are connected to each other near the bearings. Thus, for example, one roller section to be connected to another was previously provided with a square hole into which a square shaft portion on the other part was inserted. Heretofore, the individual roller sections have also been connected to each other by screw threads in that a screw-threaded journal on one section was screwed into a threaded bore in the adjacent section.

The advantage of such simple coupling means consists in the small amount of space required. For this reason they have been used very frequently. However, they have a serious disadvantage, namely, that the individual roller sections can be disassembled and removed only if the entire line of connected sections at one side of a particular coupling is lifted out of the respective bearings. Only then will it be possible to carry out the lateral shifting movement which is required in order to disconnect the respective coupling, for example, a screw coupling, so that the respective roller section can be removed. This complicated manipulation also entails the danger that the entire line of rollers or the portions thereof near the couplings will be bent. Such screw couplings also require either right-hand or left-hand threads, depending upon the side from which the roller is driven. Therefore, if the machine is driven on both sides, the roller sections of one side cannot be used at the other side and can thus not be exchanged for each other.

Attempts have also been made in the past to connect the roller sections to each other by means of built-in coil springs. Aside from the fact that after a certain period of time, such springs are subject to fatigue, such couplings are also rather complicated, and individual roller sections just like those provided with screw couplings can be removed only after the entire line of rollers has been lifted out of the bearings.

Such disassembly necessarily means long stoppage of the entire machine, relatively high repair costs, and an uneconomical production.

These disadvantages as above described particularly with reference to drawing rollers of spinning machines are equally applicable to the other mentioned types of rollers, drums, and shafts since a repair on any of them make it imperative to stop the entire machine.

It is therefore the principal object of the present invention to provide a new type of coupling which will overcome all of the above-mentioned disadvantages.

According to the invention, this object is attained by providing coupling members of one and the same type or design at the ends of each section of a long drum, roller, or shaft, while providing an intermediate connecting member parallel to the axis of the coupling members, and mounting each coupling member so as to be easily connected with or disconnected from the intermediate member so that each section can also be easily connected with or disconnected from the adjacent sections. Although the individual parts of the coupling according to the invention may be of various designs, they all have in common that the coupling members of each coupling are exactly alike, while the intermediate connecting member may either be similar to or different from the coupling members. Thus, the coupling members and the intermediate connecting member may consist of interengaging gears, friction wheels which are adapted to revolve along each other, or the like, or the coupling members may consist of sprocket wheels, friction wheels, or the like, while the intermediate member may consist of a chain, a belt, or the like.

Another feature of the present invention consists in that the individual sections of two parallel lines of shafts or rollers may be connected to or separated from each other by a single intermediate member which is mounted at a point near the bearings of the corresponding sections. Another feature of the new coupling and connecting members consists in the possibility of using them to convert a uniform motion into a nonuniform motion.

The coupling according to the invention therefore has the advantage of being applicable to all of the various compound shafts, rollers, drums, or the like which extend over the entire length of the machine. It has numerous other advantages, for example, that it permits the individual sections of drawing rollers to be very easily disconnected from each other and to be removed from the line of interconnected rollers without requiring the disassembly or removal of any coupling members and without requiring the line of rollers to be shifted laterally by lifting the respective roller section. It is for this purpose also no longer necessary to loosen or remove all of the upper rollers or pressure rollers resting on the line of rollers in question, which would require that the entire machine first be stopped. The partial disassembly made possible by the present invention may be carried out not only for necessary repair work but also for the purpose of thoroughly cleaning the machine while it will no longer be necessary to interrupt the entire operation of the machine but only to stop one roller or shaft section thereof. Since the driving force will then be transmitted by the other rollers or by the cleaning roller, the machine may then continue its production inasmuch as the roller sections of the entire length of the respective part of the draw frame may be disassembled and reinstalled one after the other. If desired or necessary, it is thus also possible to stop the individual sections, for example, for removing obstructions, wrapped-around threads, and the like.

Over and above this, this new coupling affords numerous other advantages not only in the operation but also in the manufacture of the machine itself. Thus, for example, it was previously necessary in the manufacture of the roller sections which were provided with screw couplings to adhere to extremely accurate dimensions in order to avoid the so-called "growing" of the entire line of rollers, so that it was sometimes necessary to measure the individual parts again before installing them and to assort them into those of accurate dimensions and those of too great and too short a length so that they could be compensated relative to each other during the installation of the entire line of rollers. These operations are entirely superfluous when the couplings according to the present invention are used since even relatively large deviations from the accurate dimensions cannot cause any difficulties since the individual parts or sections of the entire line of rollers are assembled in a row with intermediate spaces which are filled out by the intermediate members which connect the adjacent couplings.

Another valuable feature of the invention consists in that several parts of a machine which extend over the same distance and consist of materials with different coefficients of expansion may be combined to form a single element without danger of any trouble developing due to the different expansion of the individual parts in their axial direction. This advantage, in turn, permits the application of light metals in the manufacture of the machines, so that, for example, the frame together with its supporting elements which extend continuously over the entire length of the machine may be made of light metal, while the rollers, drums, shafts, and the like which also extend over the entire length of the machine may be composed of individual sections or parts which consist of steel.

Another advantage of the new couplings is the fact that they will easily compensate for different degrees of wear of the bearing parts since the individual sections of the rollers, drums, or shafts are independent of each other. The new couplings, therefore, completely avoid the dangerous sagging of the long shafts or rollers which often occurred in previous machines and which easily resulted in shearing off or breaking of different parts thereof.

Further objects, features, and advantages of the present invention will be apparent from the following detailed description thereof, particularly when read with reference to the accompanying drawings which illustrate the application of the couplings according to the invention to a draw frame, and in which—

Fig. 7 shows a cross section of a drafting frame similar to that illustrated in Fig. 6; while

Figure 1:
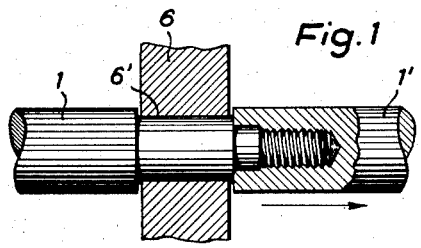
Fig. 1 illustrates a screw coupling of the prior art, partly in cross section.

Referring to the drawings, in which the same reference numerals indicate similar parts, Fig. 1 illustrates a screw coupling as frequently used prior to the invention, in which roller sections 1 and 1' are connected to each other. Roller section 1 is mounted in a bearing support 6 by means of a bearing 6' and provided with a threaded pin which engages into a threaded bore in roller section 1'. This screw coupling can only be disconnected after the entire line of rollers extending over the entire length of the machine has been lifted out of its bearings 6' in bearing supports 6.

Figure 2:
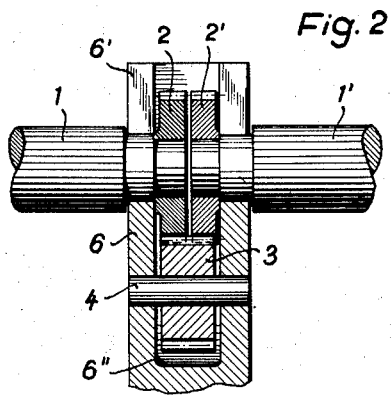
Fig. 2 shows a coupling according to the invention, also partly in cross section, for connecting two roller sections of a finishing roller of a drafting frame.
Figure 3:
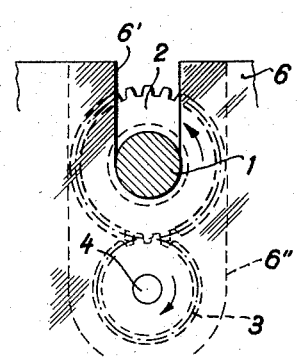
Fig. 3 shows a central vertical cross section of Fig. 2.

Figs. 2 and 3 illustrate a coupling according to the invention. The roller section 1 has the usual length and extends from one bearing support 6 to another. Each of the two adjacent reduced ends of roller sections 1 and 1' carries a spur gear 2 and 2', respectively, which is rigidly secured thereto. These two gears 2 and 2' are of equal size and engage with a single wider spur gear 3 which is rotatably mounted on a stationary shaft 4. All three gears are disposed within a recess 6" in bearing support 6 and are thus substantially enclosed therein. If desired, the upper central opening of recess 6" and the upper ends of bearing slots 6' may also be closed, preferably by easily removable means, not shown. The driving power of the line of interconnected rollers is therefore transmitted from each roller 1 through gear 2 to gear 3 and from the latter back to gear 2' and to the adjacent roller 1' so that both rollers 1 and 1' rotate in the same direction and at an equal speed.

Since the various adjacent rollers 1 and 1' of the entire line of interconnected rollers are all coupled to each other in a similar manner as shown in Fig. 2, it is evident that each roller or roller section may be easily disengaged from gears 3 and thus from the adjacent rollers and lifted entirely out of bearing slots 6' without affecting any of the other rollers of the line.

In order to reduce the friction in the bearings of the couplings of the entire line of rollers, some or all of the bearings, including those of gears 3 on shafts 4, may be provided in the form of antifriction bearings in place of the plain bearings as shown in Fig. 2. In such event it will be advisable to close recesses 6" as well as bearing slots 6' by means of removable covers.

Aside from utilizing the new coupling for its primary purpose of connecting the adjacent roller of a long line of rollers to each other, it may also be used with considerable advantage for transmitting the driving power to one or more additional rollers which extend in a direction parallel to the first rollers, and for coupling the individual rollers of such second line of rollers to each other.

Figure 4:
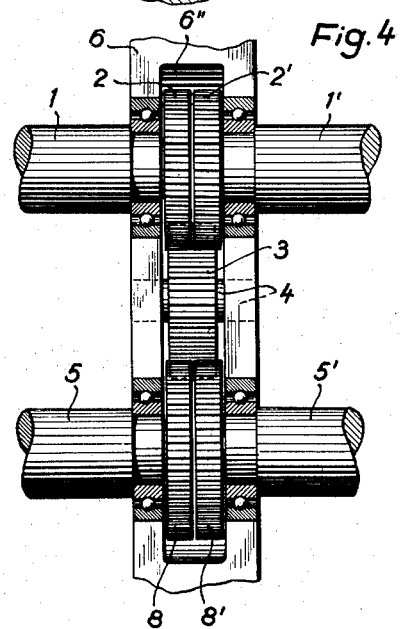
Fig. 4 shows a coupling according to the invention, partly in cross section, for connecting two roller sections of the feed roller of a drafting frame.
Figure 5:
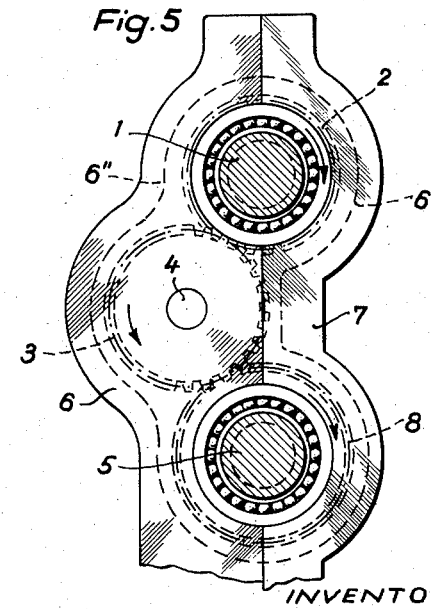
Fig. 5 shows a central vertical cross section of Fig. 4.

Figs. 4 and 5 illustrate such modification of the coupling according to the invention. The individual rollers or roller sections 1 and 1' are coupled to each other in the same manner as above described by means of spur gears 2, 3, and 2'. However, the intermediate gear 3 is also in meshing engagement with two coupling gears 8 and 8' on two adjacent rollers 5 and 5' which extend parallel to rollers 1 and 1'. Thus, rollers 5, 5' and so forth of the second line of rollers will be driven in a clockwise direction and are also coupled to each other. In some cases, it may also be sufficient to provide rollers 5 and 5' only at one end with a gear 8 so that only one roller 5 or 5' extending from one bearing support to the other will be driven by the respective spur gear 3.

The bearings of both sets of gears 2, 2' and 8, 8' are provided within the same recess 6" of bearing support 6 and are enclosed therein by a removable cover 7.

The application of an intermediate gear 3 to connect two adjacent lines of rollers 1, 1' etc. and 5, 5' etc., results in still another very important advantage.

Whereas with the arrangement according to Figs. 2 and 3, the removal of an individual roller 1 or 1' should preferably be effected at a standstill of the machine because the removal of such roller will also disconnect all axially aligned subsequent rollers from the driving power and thereby stop their movement, a different situation prevails with the line of rollers 1, 1'', etc. according to Figs. 4 and 5. In this instance, any desired roller, for example, roller 1, may be removed from the line without thereby disconnecting the adjacent roller 1' and those following the same from the driving power. The line of rollers at both sides of the place where the respective roller 1 has been removed continues to rotate since they are driven in each bearing support by means of the intermediate gears 3 which continue to drive all of the other rollers along the entire length of the machine by means of the uninterrupted line of rollers 5, 5', etc. However, even though a roller should be removed from the latter line 5, 5', etc., the machine will still continue to run since the individual parts of the line will be driven by the intermediate gears 3 in the same manner as previously described, as long as the other line 1—1', etc., does not also have to be interrupted by the removal of a corresponding roller.

The principle described in connection with the transmission of driving power by the intermediate gears 3 to rollers 1, 1', etc. and rollers 5, 5', etc., when an individual roller is removed from one line of rollers or the other, may also be applied to the line of finishing rollers. In this instance, the continuous shaft of the cleaning roller may be provided at both ends with spur gears which may be brought into engagement with the intermediate gear 3 without requiring the entire machine to be stopped until the necessary repairs have been made on the respective removed roller. The driving power is then transmitted through the respective intermediate gears 3 and the cleaning roller which replaces the action of the removed roller.

If rollers 1, 1' etc. according to Figs. 4 and 5 are used to form, for example, the feed rollers of apron drawing frames, the adjacent rollers 5, 5' etc. may form the driving rollers of the lower apron. This affords excellent previously unattainable possibilities of exchanging the individual sections of the various rollers and the entire single or double-apron system which is driven by these rollers 5, 5', etc.

Figure 6:
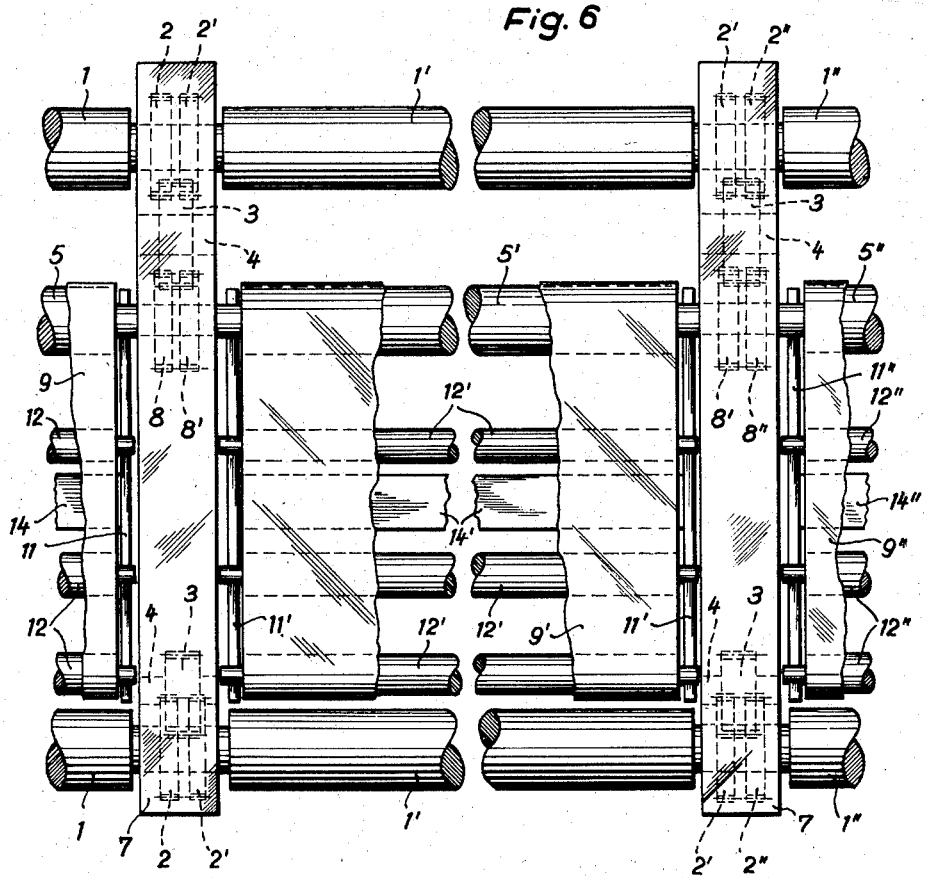
Fig. 6 shows a partial view of a drafting frame with several of the couplings according to the invention.

Fig. 6 illustrates an example of the application of the invention to a double-apron draw frame, that is, a drawing frame in which the lower apron 9' and the upper apron 10' extend from one roller stand to another.

Figure 7:
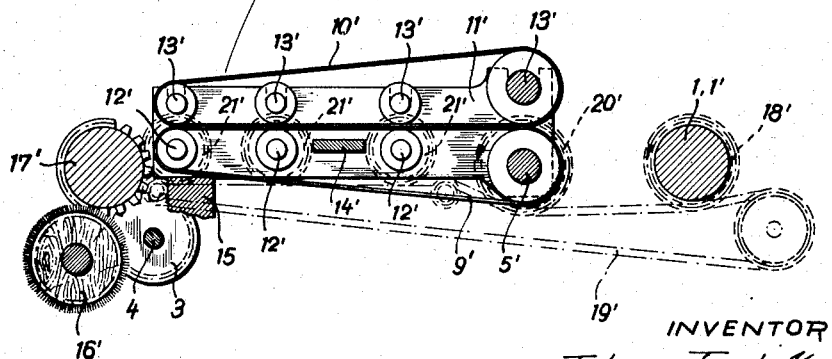

The guide rollers 12' of the lower apron and the guide rollers of the upper apron are both rotatably mounted at each end in common supporting members 11'. Each of these supporting members 11' also encompasses the shaft of the apron-driving roller 5' so that the latter is also rotatably supported thereby. At the roller stands, each of these supporting members 11' rests upon a stop member 15, as shown in Fig. 7. The two opposite supporting members 11' of one unit are rigidly connected to each other by means of a crossbar 14' which may be mounted, for example, intermediate the two webs of the lower belt.

By such a construction, an entire feed unit consisting of the upper apron 10', the lower apron 9', and the various guide rollers 13' and 12' may be pivoted upwardly about the axis of shaft 5' in clockwise direction with regard to Fig. 7. This may be done for example, by lifting the unit at the supporting members 11', and while the operation continues, and the unit may then be easily lifted out of the drawing frame without disturbing the operation of the other drawing units at the right and left sides of the removed unit.

The principle as described with respect to a double-apron drawing frame may be similarly applied to single-apron frames or roller drawing frames.

Fig. 7 illustrates a further possibility of applying the invention. The drawing frame shown therein in cross section substantially corresponds to the drawing frame shown in Fig. 6. The driving force is transmitted by the cleaning roller 16' as already described which is provided with spur gears which engage with the intermediate connecting gear 3 so that the line of finishing rollers 17, 17', etc. can continue to operate even though one of the individual rollers has been removed.

However, in the embodiment as illustrated in Fig. 7, a different type of intermediate connecting member is applied in the form of a chain 19'. In this instance, a sprocket wheel 18' is mounted on the roller section 1' and engages a chain 19' which is guided by suitable means. If each roller end is provided with a sprocket wheel 20' or 21', respectively, which engages chain 19', it is possible to drive all the guide rollers 5' and 12' of the lower belt 9'.

Figure 8:
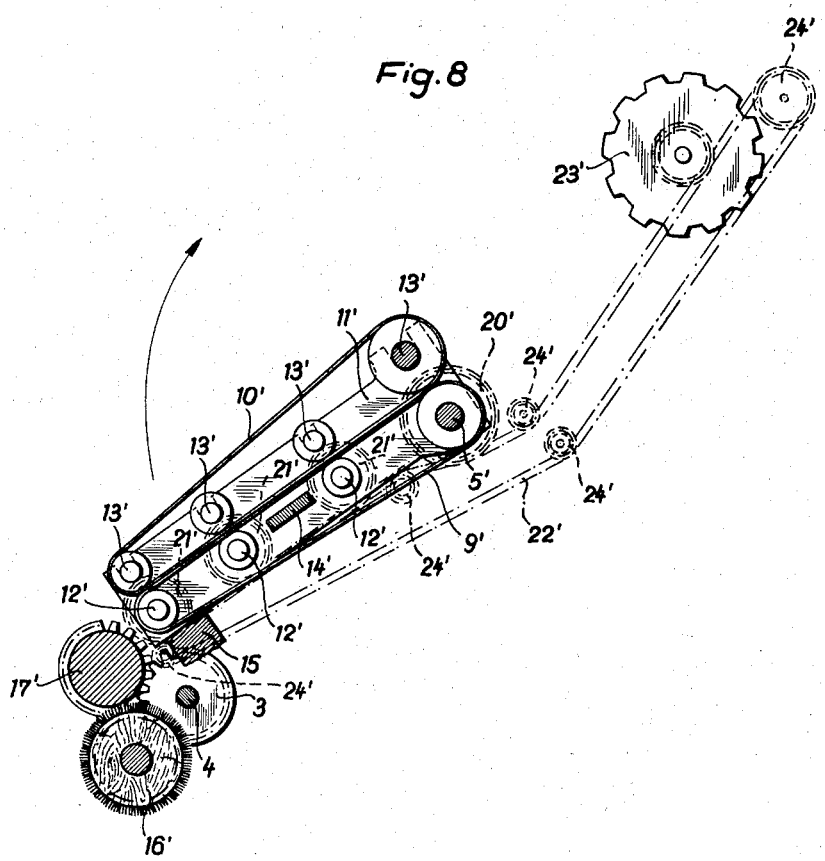
Fig. 8 shows a cross section similar to Fig. 7 of a modification thereof.

Fig. 8 illustrates another example of the manner in which large distances may be bridged by utilizing a chain as the intermediate connecting member. In this case, chain 22' serves as an intermediate member for connecting not only the individual roller sections of the unreeling frame 23', but also of guide rollers 5' and 12'. Additional guide rollers 24' are provided for guiding chain 22'.

The coupling according to the present invention may afford numerous other advantages. Thus, for example, it is no longer necessary to provide separate rollers for left-hand and right-hand rotation since the individual rollers or roller sections which are provided with such coupling may be used without alteration either at the side of a machine requiring a left-hand drive or at the side requiring a right-hand drive. This, in turn, also permits the individual roller sections to be removed, to be turned around by 180°, and to be reinserted. It is thus possible to prevent an uneven wear upon the roller grooves or to turn the entire line of rollers around end-to-end if the edges of the grooves have been worn off in the feeding direction so that, after such turning the groove edges will afford a better grip.

The new coupling also compensates for smaller changes which might occur in the level of the machine supports since the engagement of the teeth of the gears of the individual rollers into the teeth of the intermediae gears allows a sufficient flexibility so that any minor inaccuracies in the mounting of the individual rollers or shafts will in contrast to the conventional couplings not affect the entire lines of rollers or shafts.

It is furthermore possible to convert the uniform motion of one coupling element and of the respective intermediate connecting member into a nonuniform motion by utilizing the intermediate member for driving suitably shaped elements, for example, elliptical gears, for producing a differential feeding operation.

Although the present invention has been illustrated and described with reference to the preferred embodiments thereof, I wish to have it understood that it is in no way limited to the details of such embodiments or to the application thereof to the particular machines described, but is capable of numerous modifications or of being applied to various other textile machines within the scope of the appended claims.

Having thus fully disclosed my invention, what I claim is:

1. In combination in a textile machine having a shaft composed of a plurality of axially aligned rotatable shaft sections, a plurality of spaced supporting members spaced from each other in longitudinal direction of said textile machine, said supporting members including bearing means for respectively journalling the ends of said shaft sections, a plurality of pairs of rotary coupling elements of circular circumferential contour respectively associated with those ends of each adjacent pair of shaft sections which face each other, one rotary coupling element of the respective pair of coupling elements being rotatably connected to one end of a shaft section while the other rotary coupling element of the same pair of coupling elements is rotatably connected to the adjacent shaft section, and a plurality of rotatable coupling members respectively associated with said pairs of coupling elements and drivingly and detachably engaging the same for establishing driving connection between the rotary coupling elements of the pair of coupling elements engaged thereby.

2. In combination in a textile machine having a shaft composed of a plurality of roller stands spaced from each other in the longitudinal direction of said textile machine and provided with recesses, said roller stands including bearing means for respectively journalling the ends of said shaft sections, a plurality of pairs of rotary coupling elements of circular circumferential contour respectively rotatably mounted in said recesses, one rotary coupling element of each respective pair of rotary coupling elements being rotatably connected to one end of a shaft section and the other rotary coupling element of the same pair of coupling elements being rotatably connected to the adjacent end of the adjacent shaft section, and a plurality of rotatable coupling members respectively associated with said pairs of coupling elements and drivingly and detachably engaging the same for establishing driving connection between the rotary coupling elements of the pair of coupling elements engaged thereby.

3. An arrangement according to claim 1, in which said supporting members have an opening at the top for withdrawing the respective adjacent shaft section through said opening.

4. An arrangement according to claim 1, in which said coupling members and said coupling elements engaged thereby consist of intermeshing gears.

5. An arrangement according to claim 1, in which said coupling members and said coupling elements engaged thereby consist of interengaging friction wheels.

6. An arrangement according to claim 1, in which said coupling elements comprise sprocket wheels, and in which said coupling members comprise sprocket chain means.

7. An arrangement according to claim 1, in which said coupling elements comprise pulleys, while said coupling members comprise belt means engaging the respective pulleys.

8. In combination in a textile machine having two substantially parallel shafts composed of a plurality of axially aligned rotatable shaft sections, a plurality of spaced supporting members spaced from each other in longitudinal direction of said textile machine and respectively supporting adjacent axially aligned shaft section ends of said two substantially parallel shafts, two sets of a plurality of pairs of rotary coupling elements respectively associated with said two shafts, each two adjacent shaft sections of each of said two shafts having respectively rotatably connected thereto one rotary coupling element of one pair of coupling elements, and a plurality of rotary coupling members respectively associated with said supporting members, each of said coupling members of each supporting member rotatably and detachably engaging two pairs of said coupling elements respectively pertaining to said two shafts.

9. A coupling arrangement for interconnecting the adjacent individual sections of each of at least two long parallel lines of compound rollers, drums, shafts, or the like of textile machines, wherein the ends of each section are rotatably mounted in bearings, said coupling arrangement comprising: equal coupling elements at both ends of each section, a single intermediate connecting member extending parallel to the corresponding coupling elements of two adjacent sections of both parallel lines and adapted to connect said corresponding coupling elements of both lines to each other, and means for mounting said coupling elements of both lines so as to permit said adjacent sections of both lines to be quickly connected to and disconnected from each other.

10. A coupling as defined in claim 9, wherein said mounting means comprise a supporting member at the corresponding ends of each section of both parallel lines, said member having an aperture therein adapted to receive the corresponding coupling elements of both lines and said intermediate connecting member.

11. A coupling as defined in claim 10, wherein said bearings for supporting the adjacent ends of the corresponding sections of both lines are likewise disposed within said aperture and are formed by wall portions of said aperture.

12. A coupling as defined in claim 10, wherein said bearings for supporting the adjacent ends of the corresponding sections of both lines are likewise disposed within and are supported by the walls of said aperture.

References Cited in the file of this patent

UNITED STATES PATENTS

| | | |
|---|---|---|
| 284,947 | Cranston | Sept. 11, 1883 |
| 310,867 | Wheeler | Jan. 13, 1885 |
| 616,092 | Eynon | Dec. 20, 1898 |
| 897,099 | Howard | Aug. 25, 1908 |
| 1,444,343 | Goodwin | Feb. 6, 1923 |
| 2,111,693 | Schnuck | Mar. 22, 1938 |
| 2,302,853 | Gordon | Nov. 24, 1942 |
| 2,553,964 | Eggleston | May 22, 1951 |